(12) United States Patent
Arakawa et al.

(10) Patent No.: US 7,197,615 B2
(45) Date of Patent: Mar. 27, 2007

(54) REMOTE COPY SYSTEM MAINTAINING CONSISTENCY

(75) Inventors: Hiroshi Arakawa, Sagamihara (JP); Takashige Iwamura, Yokohama (JP); Yusuke Hirakawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/932,102

(22) Filed: Sep. 2, 2004

(65) Prior Publication Data
US 2006/0010300 A1 Jan. 12, 2006

(30) Foreign Application Priority Data
Jul. 7, 2004 (JP) ............................. 2004-200226

(51) Int. Cl.
*G06F 12/00* (2006.01)
(52) U.S. Cl. ........................ 711/162; 711/161; 707/203; 707/204
(58) Field of Classification Search ................. 711/161, 711/162; 707/203, 204
See application file for complete search history.

(56) References Cited

U.S. PATENT DOCUMENTS

| | | | |
|---|---|---|---|
| 5,404,548 A | 4/1995 | Nishioka | |
| 5,603,003 A | 2/1997 | Akizawa et al. | |
| 5,623,599 A | 4/1997 | Shomler | |
| 5,682,513 A | 10/1997 | Candelaria et al. | |
| 5,996,054 A | 11/1999 | Ledain et al. | |
| 6,092,066 A | 7/2000 | Ofek | |
| 6,157,991 A | 12/2000 | Arnon | |
| 6,209,002 B1 | 3/2001 | Gagne et al. | |
| 6,260,124 B1 | 7/2001 | Crockett et al. | |

(Continued)

FOREIGN PATENT DOCUMENTS

EP 0 671 686 B1 2/1995

(Continued)

OTHER PUBLICATIONS

"The Role of Back up in Data Recovery", Storage.com, pp. 1-3, Storage.com, "SRDF/Asynchronous" A Technical Description, EMC White Paper, EMC.

(Continued)

*Primary Examiner*—Sanjiv Shah
*Assistant Examiner*—Yaima Campos
(74) *Attorney, Agent, or Firm*—Antonelli, Terry, Stout and Kraus, LLP.

(57) ABSTRACT

To provide a remote copy system including: a plurality of primary storage systems and a plurality of secondary storage systems; each of the secondary storage systems including a secondary logical volume that stores a copy of the data stored in a primary logical volume of the primary storage system; a pre-update data storage part that stores pre-update data that is stored before data to be stored in the secondary logical volume is updated and time stamps of the data to be stored in the secondary logical volume; pre-update data prior to a recovery time set based on the time stamps stored in the pre-update data storage part is obtained from the pre-update data storage part; and the pre-update data is written to the secondary logical volume in an inverse order of the time stamp with the latest time stamp first, to recover data of the secondary logical volume.

18 Claims, 13 Drawing Sheets

U.S. PATENT DOCUMENTS

| | | | |
|---|---|---|---|
| 6,301,643 B1* | 10/2001 | Crockett et al. | 711/162 |
| 6,353,878 B1 | 3/2002 | Dunham | |
| 6,366,987 B1 | 4/2002 | Tzelnic et al. | |
| 6,408,370 B2 | 6/2002 | Yamamoto et al. | |
| 6,463,501 B1 | 10/2002 | Kern et al. | |
| 6,581,143 B2 | 6/2003 | Gagne et al. | |
| 6,647,474 B2 | 11/2003 | Yanai et al. | |
| 6,658,434 B1 | 12/2003 | Watanabe et al. | |
| 6,665,781 B2 | 12/2003 | Suzuki et al. | |
| 6,771,843 B1* | 8/2004 | Huber et al. | 382/305 |
| 6,816,951 B2 | 11/2004 | Kimura et al. | |
| 6,842,834 B2 | 1/2005 | Crockett et al. | |
| 6,847,984 B1* | 1/2005 | Midgley et al. | 707/204 |
| 6,871,271 B2* | 3/2005 | Ohran et al. | 711/162 |
| 6,898,685 B2 | 5/2005 | Meiri et al. | |
| 6,934,877 B2* | 8/2005 | Tamatsu | 714/5 |
| 2002/0078296 A1 | 6/2002 | Nakamura et al. | |
| 2003/0050930 A1 | 3/2003 | Mosher, Jr. et al | |
| 2003/0051111 A1 | 3/2003 | Nakano et al. | |
| 2003/0078903 A1 | 4/2003 | Kimura et al. | |
| 2003/0158873 A1* | 8/2003 | Sawdon et al. | 707/204 |
| 2003/0177321 A1 | 9/2003 | Watanabe | |
| 2003/0188116 A1 | 10/2003 | Suzuki et al. | |
| 2003/0229764 A1 | 12/2003 | Ohno et al. | |
| 2004/0024975 A1 | 2/2004 | Morishita et al. | |
| 2004/0078399 A1 | 4/2004 | Tabuchi et al. | |
| 2004/0128442 A1 | 7/2004 | Hinshaw et al. | |
| 2004/0139128 A1 | 7/2004 | Becker et al. | |
| 2004/0148477 A1 | 7/2004 | Cochran | |
| 2004/0193802 A1 | 9/2004 | Meiri et al. | |
| 2004/0193816 A1 | 9/2004 | Meiri et al. | |
| 2004/0250030 A1 | 12/2004 | Ji et al. | |
| 2004/0250031 A1 | 12/2004 | Ji et al. | |
| 2004/0260972 A1 | 12/2004 | Ji et al. | |
| 2004/0267829 A1 | 12/2004 | Hirakawa et al. | |
| 2004/0267836 A1* | 12/2004 | Armangau et al. | 707/203 |
| 2004/0268177 A1 | 12/2004 | Ji et al. | |
| 2005/0033828 A1 | 2/2005 | Watanabe | |
| 2005/0066122 A1 | 3/2005 | Longinov et al. | |
| 2005/0066222 A1* | 3/2005 | Rowan et al. | 714/5 |
| 2005/0071708 A1* | 3/2005 | Bartfai et al. | 714/5 |
| 2005/0091415 A1 | 4/2005 | Armitano | |
| 2005/0102554 A1 | 5/2005 | Zohar et al. | |
| 2005/0120056 A1 | 6/2005 | Meiri et al. | |
| 2005/0120092 A1 | 6/2005 | Nakano et al. | |
| 2005/0125465 A1 | 6/2005 | Arakawa et al. | |
| 2005/0125617 A1 | 6/2005 | Ninose et al. | |
| 2005/0132248 A1 | 6/2005 | Lecrone et al. | |
| 2005/0149666 A1 | 7/2005 | Meiri et al. | |
| 2005/0149817 A1 | 7/2005 | Biran et al. | |
| 2005/0198454 A1 | 9/2005 | Yoder et al. | |
| 2005/0213389 A1 | 9/2005 | Iwamura et al. | |

FOREIGN PATENT DOCUMENTS

| | | |
|---|---|---|
| EP | 672985 | 9/1995 |
| EP | 674263 | 9/1995 |
| EP | 1150210 | 10/2001 |
| EP | 1217523 | 6/2002 |
| EP | 1538527 | 6/2005 |
| JP | 6-149485 | 5/1994 |
| JP | 2004-13367 | 1/2004 |
| WO | WO 01/16748 | 3/2001 |
| WO | WO 2005/31578 | 4/2005 |

OTHER PUBLICATIONS

"The Role of Back up in Data Recovery", Storage.com, pp. 1-3, Storage.com.

"SRDF/Asynchronous" A Technical Description, EMC White Paper, EMC.

* cited by examiner

REMOTE COPY SYSTEM MAINTAINING CONSISTENCY

CLAIM OF PRIORITY

The present application claims priority from Japanese application P2004-200226 filed on Jul. 17, 2004, the content of which is hereby incorporated by reference into this application.

BACKGROUND

This invention relates to a remote copy system in which a plurality of storage systems hold copies of data used by a computer, and more particularly to a technique of rolling back a plurality of storage systems in synchronization with each other.

Computer systems available in recent years use an increased amount of data, and have the data updated more frequently. It is a major challenge in the storage field how such data is backed up and how rapidly a system can be recovered to a normal operation state upon the occurrence of a fault. As a measure to this end, there is disclosed a remote copy technique in which a plurality of storage subsystems (external storage systems) equipped with magnetic disk arrays are placed in remote locations and connected to each other via a communication path, and data updated in one storage subsystem is automatically copied to another storage subsystem without the intermediation of a host computer (refer to JP 2004-13367 A).

In addition, there is proposed a system using a write time as a technique of ensuring consistency of data between a primary storage and a secondary storage. More specifically, a primary storage system receiving write data from a primary host notifies the primary host that the primary storage system has received write data immediately after receiving the write data. After that, the primary host reads a copy of the write data from the primary storage system. Each piece of write data is appended with a write time that is the time when a corresponding write request is issued. When the primary host reads the write data, the write time is sent to the primary host together. Further, the primary host transfers the write data and the write time to a secondary host.

The secondary host that has received the write data and the write time writes information including the write time into a control volume of a secondary storage system. The secondary host further writes the write data into the secondary storage system in the order of the write time by referencing the write time appended to each piece of write data. By writing the write data into the secondary storage system in the order of the write time, consistent data can be held in the secondary storage system at all times (refer to EP 0671686).

SUMMARY

In the above-mentioned related art, a host needs to be operating constantly in order to keep performing processes of transferring and mirroring data without intermission. In addition, programs for executing the above processes need to be running constantly, thereby imposing a process load on the host at all times.

Also, in the case where a plurality of storage systems are connected to a plurality of other storage systems via a plurality of paths, since asynchronous processes of copying data between the storage systems are performed at arbitrary timings, time to update data are different depending on the paths between the storage systems and the other storage systems. Accordingly, upon failover, data stored in the storage systems may exhibit inconsistency between the paths. This may hinder a secondary site from providing a service.

It is therefore an object of this invention to implement failover synchronized between a plurality of paths in the case where the plurality of paths are set as paths for remotely copying a storage system to another storage system.

According to an embodiment of the present invention, there is provided a remote copy system for copying data between a plurality of storage systems, including: a plurality of primary storage systems to and from which data is inputted and outputted; and a plurality of secondary storage systems that are connected to each of the primary storage systems, each of the primary storage systems including a primary logical volume that stores the data that is inputted and outputted, each of the secondary storage systems including: a secondary logical volume that stores a copy of the data stored in the primary logical volume; and a pre-update data storage part that stores pre-update data that is stored before data to be stored in the secondary logical volume is updated and time stamps of the data to be stored in the secondary logical volume, in which in each of the secondary storage systems, the pre-update data is stored in the pre-update data storage part, and then write data transferred from the primary storage system is stored in the secondary logical volume in an order in which the write data is written into the primary logical volume; pre-update data prior to a recovery time set between a time stamp that is earliest among the latest time stamps stored in the pre-update data storage part and a time stamp that is latest among the earliest time stamps stored in the pre-update data storage part is obtained from the pre-update data storage part; and the pre-update data is written to the secondary logical volume in an inverse order of the time stamp with the latest time stamp first, to recover data of the secondary logical volume to the recovery time.

Further, in the remote copy system according to the embodiment of the present invention, the pre-update data storage part further stores post-update data stored in the secondary logical volume; and in each of the secondary storage systems, the time stamp of the latest data that is currently stored in the secondary logical volume is compared with the previous recovery time; when the time stamp of the latest data that is currently stored in the secondary logical volume is later than the previous recovery time, the pre-update data after the recovery time is obtained from the pre-update data storage part and the obtained pre-update data is written to the secondary logical volume in the inverse order of the time stamp with the latest time stamp first; and when the time stamp of the latest data that is currently stored in the secondary logical volume is earlier than the previous recovery time, the post-update data prior to the recovery time is obtained from the pre-update data storage part and the obtained post-update data is written to the secondary logical volume in the order of the time stamp with the earliest time stamp first.

Further, the remote copy system according to embodiment of the present invention further includes a secondary computer that is connected to the secondary storage system, and in the remote copy system, the secondary computer obtains the time stamps stored in the pre-update data storage part from the secondary storage system, obtains the latest time stamp and the earliest time stamp from the time stamps, determines the recovery time between the obtained latest time stamp and the obtained earliest time stamp, and instructs each of the secondary storage systems to recover data to the determined recovery time.

Further, in the remote copy system according to embodiment of the present invention, the secondary computer obtains the time stamps of the data stored in the secondary logical volume from the secondary storage system, determines, as a deletable time, the earliest time stamp among the latest time stamps of the data stored in the secondary logical volume, and notifies the secondary storage system of the determined deletable time, and in the secondary storage system, the pre-update data having a time stamp earlier than the received deletable time is deleted from the pre-update data storage part.

That is, according to an embodiment of this invention, the primary storage system transfers a write time appended to a write request together with the data to the secondary storage system. The secondary storage system obtains pre-update data as a journal before mirroring the transferred data on the copied data, so that the stored data can be recovered into the pre-update data. Each secondary storage system mirrors the data received from the primary storage system at an appropriate timing.

When a fault occurs, a management program collects, from each secondary storage system, information indicating which write time the data has been recovered to, and instructs the secondary storage system to roll back the data to a point in time at which consistency is maintained for the mirrored data. By executing such a rollback process, the secondary storage system can recover the consistent data in each secondary storage system.

Further, the management program collects, from each secondary storage system, information indicating which write time the data has been mirrored to, and then instructs the secondary storage system to delete the data to a time at which consistency is maintained for the mirrored data.

According to embodiment of the present invention, even in the case where a plurality of primary storage systems and secondary storage systems exist and operate for asynchronous remote copy, I/O process loads on the primary storage systems and loads on hosts do not increase. In addition, when a fault occurs, it is possible to maintain consistent data between a plurality of storage systems. Consequently, this invention is effectively applied to a large-scale disaster recovery system.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Hereinafter, description will be made of embodiments of this invention with reference to the drawings.

Figure 1:
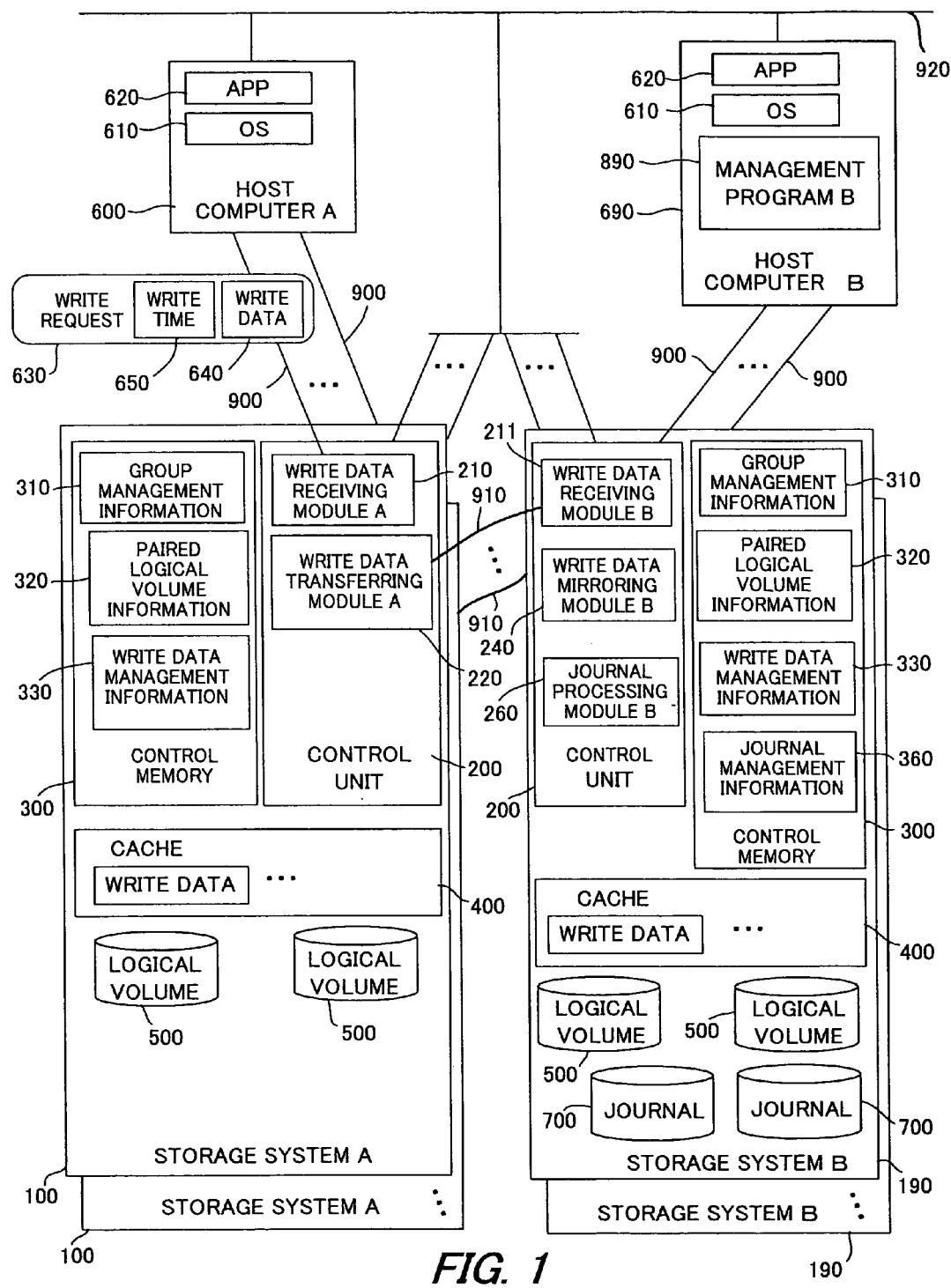
FIG. 1 is a block diagram of a computer system according to a first embodiment of this invention.

FIG. 1 is a block diagram of a computer system according to a first embodiment of this invention.

The computer system includes a plurality of primary storage systems A 100, a plurality of secondary storage systems B 190, a host computer A 600, and a host computer B 690. The host computer A 600 and the host computer B 690 are each a computer device including a CPU and a memory. The host computer A 600 is normally used, while the host computer B 690 is normally in a standby state.

The primary storage systems A 100 are each connected to the host computer A 600 via an I/O path 900. Also, the secondary storage systems B 190 are each connected to the host computer B 690 via another I/O path 900. The primary storage systems A 100, the secondary storage systems B 190, the host computer A 600, and the host computer B 690 are connected to one another via a network 920.

Further, an operating system (OS) 610 and an application program (APP) 620 run on each of the host computer A 600 and the host computer B 690. The application program 620 includes a database management system and other such software. A management program B 890 run on the host computer B 690.

The application program 620 on the host computer A 600 issues an I/O request through the operating system 610. The issued I/O request is transferred to the primary storage system A 100 via the I/O path 900. Similarly, the application program 620 on the host computer B 690 issues an I/O request through the operating system 610. The issued I/O request is transferred to the secondary storage system B 190 via the I/O path 900.

The primary storage systems A 100 each include a control unit 200, a control memory 300, a cache 400, and a logical volume 500.

The control unit 200 includes a write data receiving module A 210 and a write data transferring module A 220. The control unit 200 accesses the control memory 300 and uses information stored in the control memory 300 to execute a process described later.

The control memory 300 stores group management information 310, paired logical volume information 320, and write data management information 330.

The cache 400 is a high speed memory that stores read data and write data. Each primary storage system A 100 can attain high processing performance by temporarily storing data in the cache 400.

It should be noted that each unit of the primary storage system A 100 is desirably made redundant for fault tolerance and usability, and is provided with a backup power supply.

Similarly, the secondary storage systems B 190 each is provided with another control unit 200, another control memory 300, another cache 400, and another logical volume 500.

The control unit 200 includes a write data receiving module B 211, a write data mirroring module B 240, and a journal processing module B 260. The control memory 300 and the cache 400 have the same functions as those of the primary storage system A 100.

The primary storage system A 100 and the secondary storage system B 190 provide the logical volumes 500 to the host computer A 600 and the host computer B 690, respectively, as a data storage area. A single logical volume 500 is not necessarily structured by a single physical device. For example, the single logical volume 500 may be formed by assembling storage areas that are distributed to a plurality of disk drives. Also, the logical volume 500 may have, for example, a mirror structure or a redundant structure such as a RAID structure added with parity data.

The primary storage system A 100 and the secondary storage system B 190 are connected to each other via a transfer path 910. As described later, the logical volume of one of the primary storage system A 100 and the secondary storage system B 190 can store a copy of the content of the logical volume of the other. According to this embodiment, the copy of the content of the logical volume 500 of the primary storage system A 100 is stored in the logical volume 500 of the secondary storage system B 190. In other words, the updated content of the logical volume 500 of the primary storage system A 100 is sent to the secondary storage system B 190 via the transfer path 910. The updated content is then stored in the logical volume 500 of the secondary storage system B 190.

The data transferred from the primary storage system A 100 to the secondary storage system B 190 is stored in the logical volume 500 at an arbitrary timing. Accordingly, in some cases, one of two pieces of data that were simultaneously written to the primary storage systems A 100 is mirrored to the logical volume of one secondary storage system B 190, but the other piece is not mirrored to the logical volume of another secondary storage system B 190.

As described later, the primary storage system A 100 and the secondary storage system B 190 have management information indicating the relationship between their logical volumes 500 in terms of data copy. The management information is used for storing the copied data described above in the logical volume 500 of the secondary storage system B 190. The relationship between the logical volumes 500 and the relationship between logical volume groups described later are set by a user as necessary.

It should be noted that the primary storage systems A 100 and the secondary storage systems B 190 are not necessarily connected on a one-to-one basis. More specifically, the number of the logical volumes and the number of logical volume groups are not necessarily equal to within the primary storage systems A 100 and the secondary storage systems B 190, as long as the source logical volumes and the source logical volume groups correspond to the target logical volumes and the target logical volume groups, respectively.

The secondary storage system B 190 stores a journal 700. A storage area for the journal 700 may be provided separately from the logical volume 500, or may be provided in a portion of the storage area of the logical volume 500. Alternatively, the journal 700 may be provided not within the secondary storage system B 190 but separately from the secondary storage system B 190.

Figure 10:
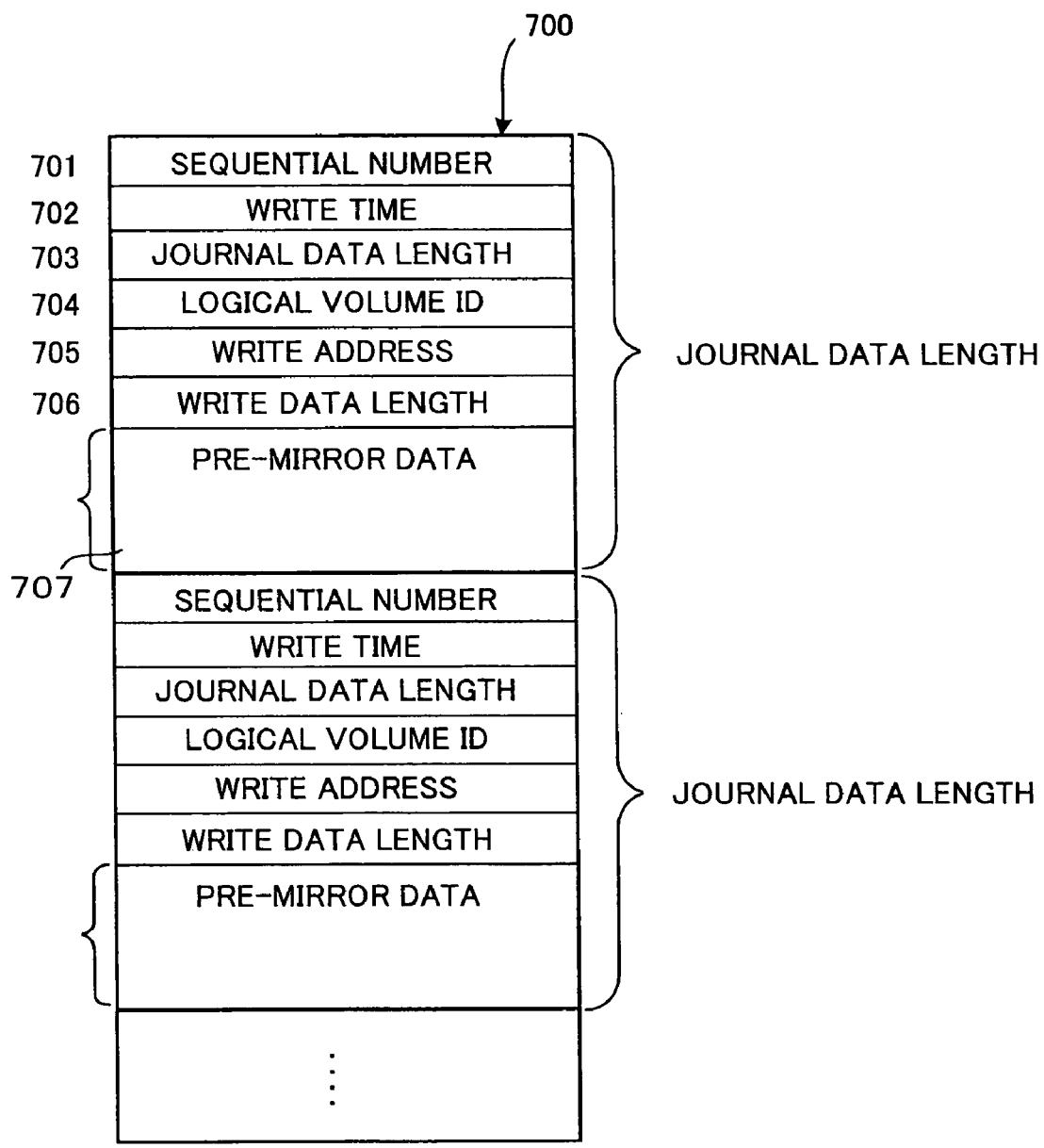
FIG. 10 is a structural diagram of a journal according to the first embodiment of this invention.

As shown in FIG. 10, stored in the journal 700 are pre-update data on which the write data transferred from the primary storage system A 100 to the secondary storage system B 190 is not yet mirrored to the logical volume 500, and the management information for the pre-update data. In a modified example shown in FIG. 14, post-update data (write data) to be stored in the logical volume 500 of the secondary storage system B 190 is stored in the journal 700 in addition to the pre-update data and the management information.

It should be noted that in the above configuration, the host computer B 690 is not connected directly to the primary storage systems A 100, but may be connected to the primary storage systems A 100 via I/O paths (not shown). In this case, when a fault occurs in the host computer A 600 or the secondary storage system B 190, the host computer B 690 can take over an operation that has been executed by the host computer A 600 by using the stored content of the logical volume 500 of the primary storage system A 100.

Further, in the above configuration, a management program B 890 is executed by the host computer B 690, but may be executed by any one of the host computer A 600, the primary storage system A 100, and the secondary storage system B 190. Alternatively, the management program B 890 may be executed by another computer (not shown) connected to the primary storage system A 100 and the secondary storage system B 190.

Figure 2:
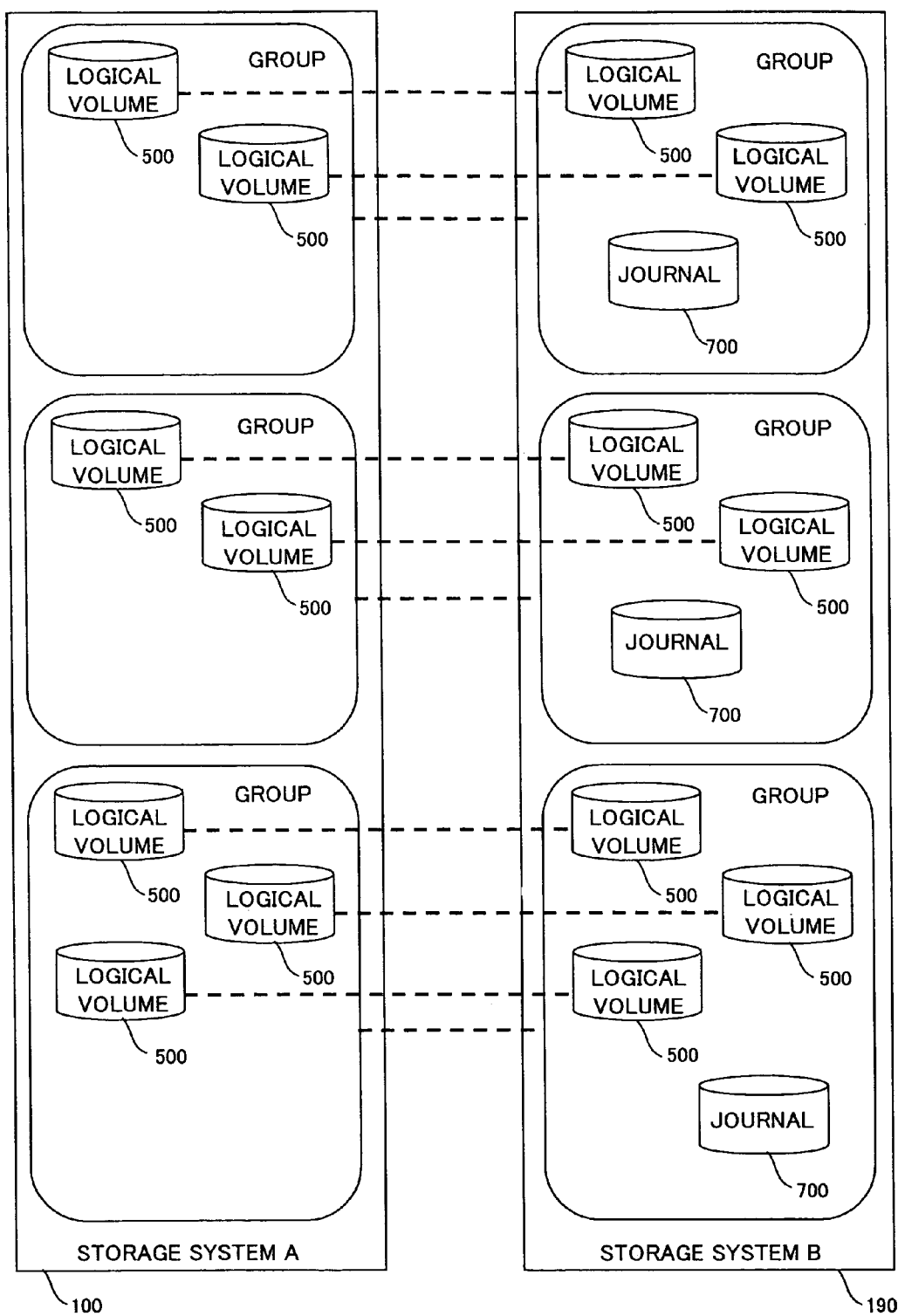
FIG. 2 is a conceptual diagram of logical volume groups according to the first embodiment of this invention.

FIG. 2 is a conceptual diagram of the logical volume group.

In this embodiment, the logical volumes are related to one another on a group basis. In FIG. 2, broken lines indicate copy relationships between the logical volumes 500 and between the logical volume groups, that is, correspondences between sources and targets. In this embodiment, processes of transferring the write data between the storage systems and mirroring the data in the secondary storage system B 190 are managed in such a unit of the logical volume group having a plurality of logical volumes. Also, resources necessary for the above processes are allocated to each logical volume group.

If the management of those copy relationships or the allocation of the resources was performed on a logical group basis, a large number of objects should be managed and the management would be complicated. Also, many objects to be processed would probably increase the resources necessary for the processes.

On the other hand, if the entire primary storage system A 100 was set as a unit, it would be difficult to perform management corresponding to the characteristics of the logical volume 500. In particular, hosts (for example, main frame hosts and open system hosts) different in performance required for connection to the logical volume 500 are divided into separate groups, and the write data is processed in each group. Further, it is preferable that the operation by a user for a process of transferring the write data, the setting of tuning conditions, and the like be received on a group basis.

By providing such logical volume groups, it is possible to provide a flexible copy process and the management of the logical volume groups corresponding to the needs of a user or an operation.

Figure 3:
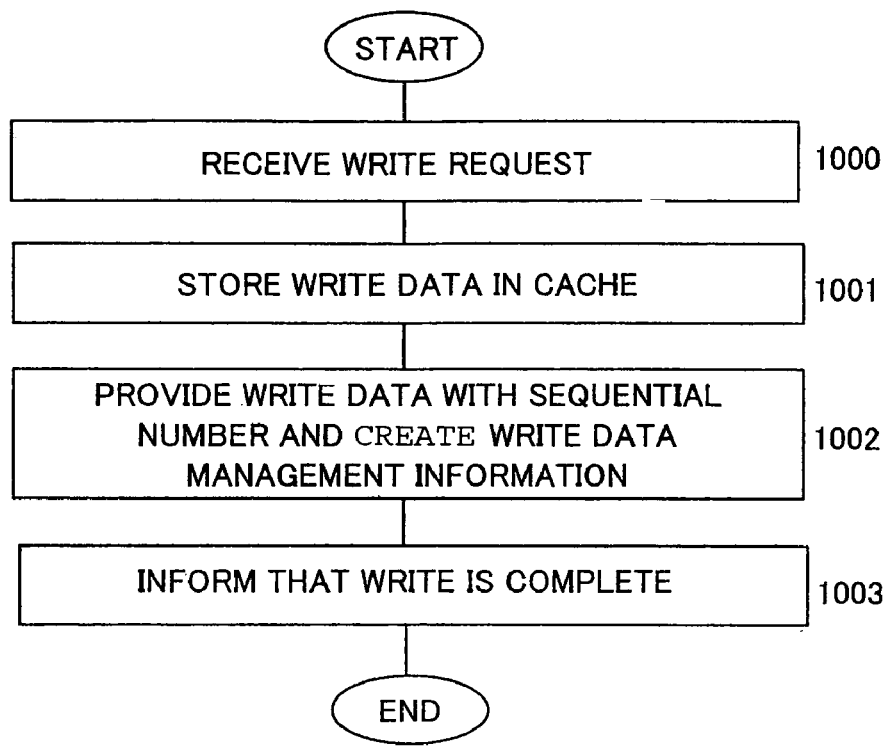
FIG. 3 is a flow chart of a process performed in the case where a storage system A receives a write request according to the first embodiment of this invention.

FIG. 3 is a flow chart of a process performed in the case where the primary storage system A 100 receives from the host computer A 600 a write request with respect to the source logical volume 500 whose copy is being created. The process is executed by the write data receiving module A 210.

The write data receiving module A 210 receives a write request from the host computer A 600 (step 1000).

The write data receiving module A 210 then stores write data in the cache 400 (step 1001). After that, the group management information 310 is referenced to provide the write data with a sequential number and create the write data management information 330 (step 1002).

The write data receiving module A 210 finally notifies the host computer A 600 that the write is complete (step 1003).

A write data receiving process described above does not include a process of writing the write data stored in the cache 400 to a physical recording medium (disk drive) of the logical volume 500, a process of transferring the write data to the secondary storage system B 190, or other such processes requiring much time. Those processes are executed at appropriate timings after the write data receiving process, that is, asynchronously with the reception of the write data. Therefore, it is only a short time after the write data receiving module A 210 receives the write request until it notifies that the write is complete, thereby realizing a high speed response with respect to the host computer A 600.

Figure 4:
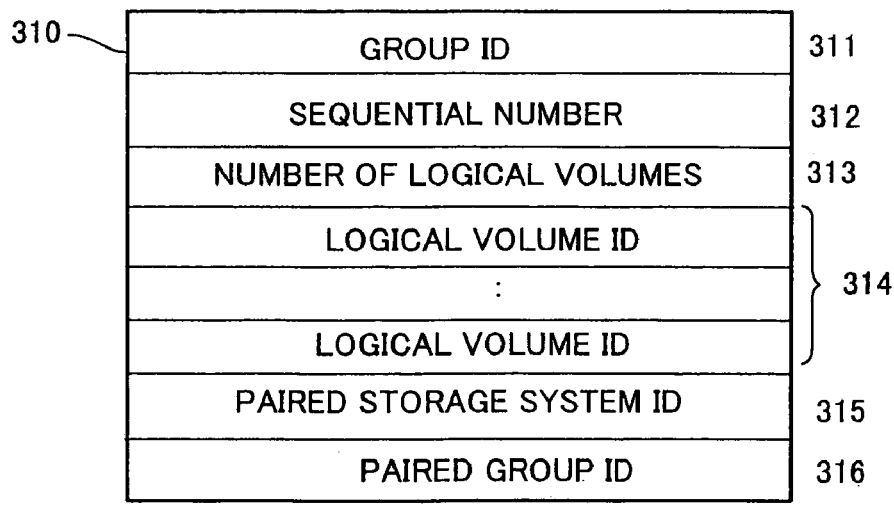
FIG. 4 is a structural diagram of group management information according to the first embodiment of this invention.

FIG. 4 is a structural diagram of the group management information 310 for each logical volume group.

In the group management information 310, information for managing the structure of the logical volume group is defined. The group management information 310 includes a group ID 311, a sequential number 312, the number of logical volumes 313, a logical volume ID 314, a paired storage system ID 315, and a paired group ID 316.

The group ID 311 is an identifier that specifies a logical volume group in the primary storage system A 100.

The sequential number 312 has a value that increments to be sequentially provided to a piece of write data with respect to logical volumes belonging to the logical volume group. The initial value of the sequential number is, for example, "0", and the sequential number increments by one and is sequentially provided to the piece of write data.

The number of logical volumes 313 is the number of the logical volumes belonging to the logical volume group.

The logical volume ID 314 is an identifier that specifies a logical volume belonging to the logical volume group uniquely in the primary storage system A 100.

The paired storage system ID 315 is an identifier that specifies a storage system having a logical volume group paired with the logical volume group concerned. In this embodiment, for example, by using a serial number of the secondary storage system B 190 as the paired storage system ID 315, a storage system that stores the copy of the data stored in the logical volume belonging to the logical volume group concerned is specified.

The paired group ID 316 is a unique identifier that specifies the logical volume group paired with the logical volume group to which the logical volume concerned belongs in the paired storage system (secondary storage system B 190). In other words, the paired group ID 316 specifies the logical volume group to which the paired logical volume 500 that stores the copy of the data stored in the logical volume belonging to the logical volume group concerned belongs.

Figure 5:
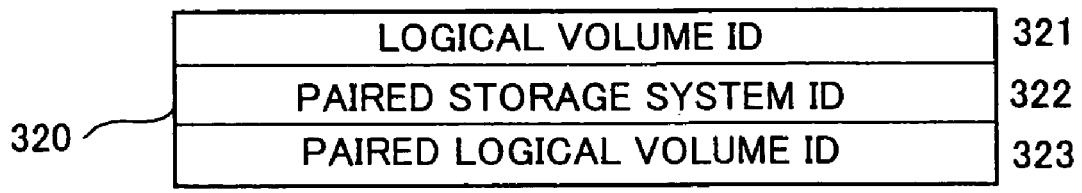
FIG. 5 is a structural diagram of paired logical volume information according to the first embodiment of this invention.

FIG. 5 is a structural diagram of the paired logical volume information 320 for each logical volume group.

In the paired logical volume information 320, information on a pair of source logical volume and target logical volume is defined. The paired logical volume information 320 includes a source logical volume ID 321, a target storage system ID 322, and a target logical volume ID 323.

The logical volume ID 321 is an identifier that specifies a source logical volume (logical volume 500 of the primary storage system A 100).

The paired storage system ID 322 is an identifier that specifies a secondary storage system B 190 having a paired logical volume paired with the source logical volume specified by the logical volume ID 321. In this embodiment, for example, by using the serial number of the secondary storage system B 190 as the target storage system ID 322, a storage system that stores the copy of the data stored in the logical volume is specified.

The paired logical volume ID 323 is an identifier that specifies the paired logical volume of the paired storage system B 190. In other words, the paired logical volume ID 323 specifies the target logical volume 500 that stores the copy of the data stored in the logical volume.

Figure 6:
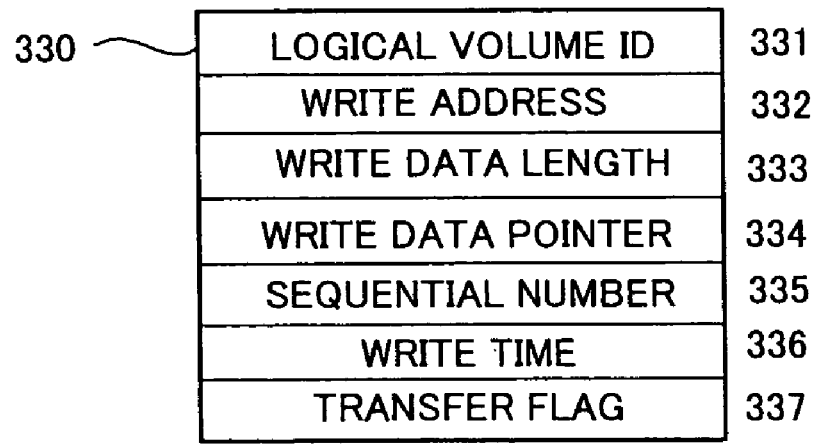
FIG. 6 is a structural diagram of write data management information according to the first embodiment of this invention.

FIG. 6 is a structural diagram of the write data management information 330 for managing each piece of write data.

In the write data management information 330, information for managing the write data stored in the logical volume is defined. The write data management information 330 includes a logical volume ID 331, a write address 332, a write data length 333, a write data pointer 334, a sequential number 335, a write time 336, and a transfer flag 337.

The logical volume ID 331 is a unique identifier that specifies the logical volume storing write data.

The write address 332 is a write start address of the write data in the logical volume.

The write data length 333 is a length of the write data.

The write data pointer 334 is a start address of a storage area for the write data in the cache 400.

The sequential number 335 is a numbers that are sequentially provided to a piece of write data in a logical volume group to which a logical volume to which the write data is written belongs.

The write time 336 is equal to a time 650 when the host computer A 600 issued a write request 630.

The transfer flag 337 is information indicating whether the write data needs to be transferred to the secondary storage system B 190. The write data receiving module A 210 sets the transfer flag 337 when receiving the write data to create the write data management information 330.

The write data management information 330 is created and managed, for example, in a list format for each logical volume group.

Figure 7:
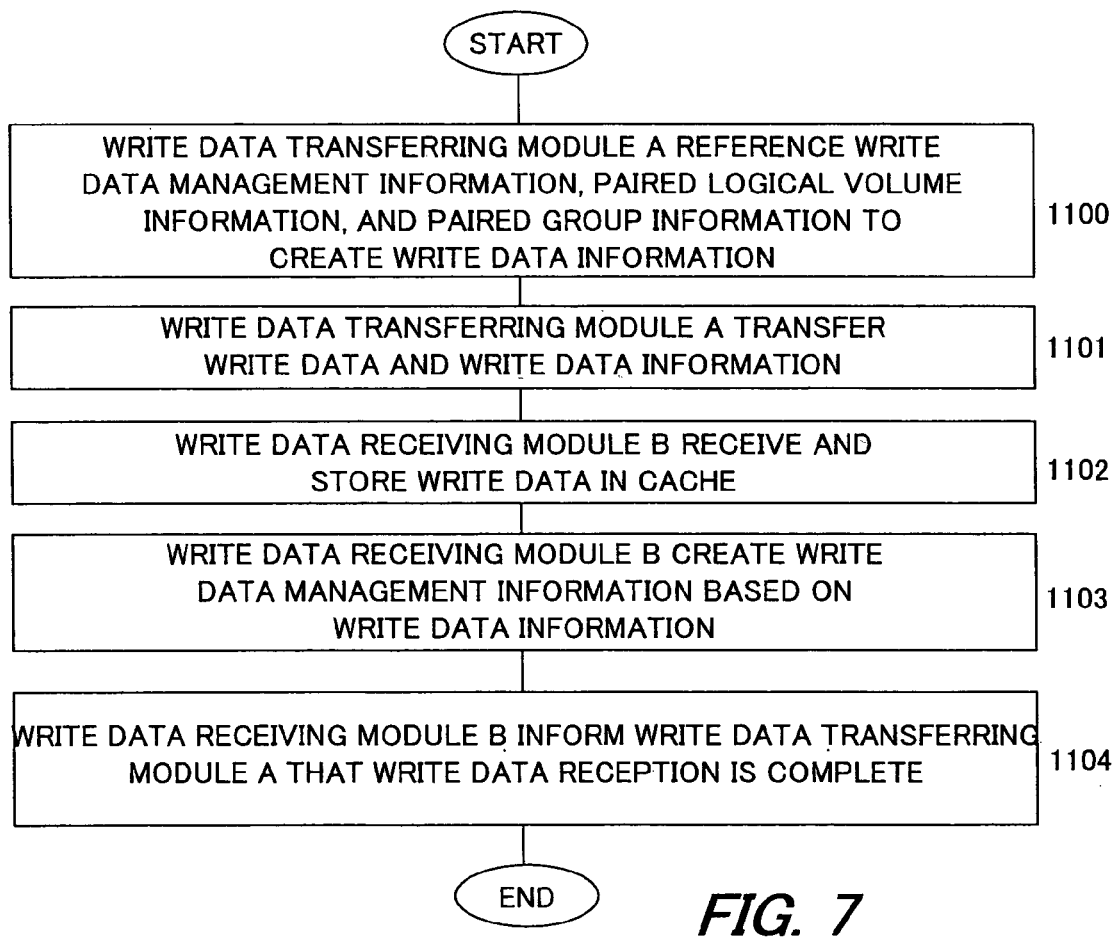
FIG. 7 is a flow chart of a process of transferring write data from the storage system A to a storage system B according to the first embodiment of this invention.

FIG. 7 is a flow chart of the process of transferring write data from the storage system A to the storage system B. Such a transfer process is executed by the write data transferring module A 220 of the primary storage system A 100 and the write data receiving module B 211 of the secondary storage system B 190.

First, the write data transferring module A 220 references the write data management information 330 to specify write data to be transferred. After that, the write data transferring module A 220 creates write data information relating to the write data to be transferred to the secondary storage system B 190, by referring to the write data management information 330, group management information 310, and the paired logical volume information 320 (step 1100).

The write data information created in step 1100 includes the write address 332, the write data length 333, the sequential number 335, and the write time 336 that are obtained from the write data management information 330. The write data information created above further includes the paired storage system ID 322 and the paired logical volume ID 323 that are obtained from the paired logical volume information 320. The write data information created above further includes the paired group ID 316 obtained from the group management information 310 based on the logical volume ID 331.

Then, the write data transferring module A 220 transfers the write data and the write data information created in step 1100 to the secondary storage system B 190 (step 1101).

After that, the write data receiving module B 211 of the secondary storage system B 190 stores the received write data and write data information in the cache 400 (step 1102). And then the write data receiving module B 211 creates the write data management information 330 from the received write data information (step 1103).

Finally, the write data receiving module B 211 notifies the write data transferring module A 220 that the write data reception is complete (step 1104). The write data transferring module A 220 of the primary storage system A 100 which has received such a completion notification of the write data reception clears the transfer flag of the write data management information 330 into an unset state with respect to the write data corresponding to the completion notification. At the same time, the primary storage system A 100 can remove from the cache 400 the transferred write data that has been held for the transfer to the secondary storage system B 190.

The write data management information 330 of the secondary storage system B 190 includes information on the same items as the write data management information 330 of the primary storage system A 100. The same pieces of data are stored in the write data management information 330 of the secondary storage system B 190 except that data for the items are different from those in the write data management information 330 of the primary storage system A 100.

It should be noted that the logical volume ID 331 is an identifier that specifies the target logical volume 500 storing the copy data. The write data pointer 334 is the start address of a storage area for the piece of write data in the cache 400 of the secondary storage system B 190. The transfer flag 337 constantly is not set.

The secondary storage system B 190 holds the group management information 310. The group management information 310 of the secondary storage system B 190 includes information on the same items as the group management information 310 of the primary storage system A 100. It should be noted that the group ID 311 is an identifier that specifies a logical volume group to which the target logical volume 500 storing the copy data belongs. The paired storage system ID 315 is an identifier that specifies the source storage system A 100. The paired group ID 316 is an identifier that specifies a logical volume group to which the source logical volume 500 belongs of the paired storage system A 100.

The secondary storage system B 190 also holds the paired logical volume information 320. The paired logical volume information 320 of the secondary storage system B 190 includes information on the same items as the paired logical volume information 320 of the primary storage system A 100. It should be noted that the logical volume ID 321 is an identifier that specifies the logical volume 500 storing the copy. The paired storage system ID 322 is an identifier that specifies the source storage system A 100. The paired logical volume ID 323 is an ID that specifies the source logical volume 500 of the paired storage system A 100.

It should be noted that in the process of transferring write data described above, the write data transferring module A 220 first transfers write data to the write data receiving module B 211 (step 1101). However, the write data receiving module B 211 may issue a transfer request for write data to the write data transferring module A 220, and the write data transferring module A 220 that has received the transfer request may then transfer the write data to the write data receiving module B 211. By having the transfer request for write data issued in advance, the timing of transferring write data can be controlled based on the process conditions, process loads, amounts of accumulated write data, etc. in the secondary storage systems B 190.

Also, in the process of transferring write data described above, the write data receiving module B 211 stores write data in the cache 400 (step 1102). However, a logical volume 500 for storing write data may be prepared aside from the cache 400, and the write data may be stored in the logical volume 500 for storing write data. In general, the logical volume 500 has a larger capacity than the cache 400 and can therefore accumulate larger amount of write data.

Figures 8, 9:
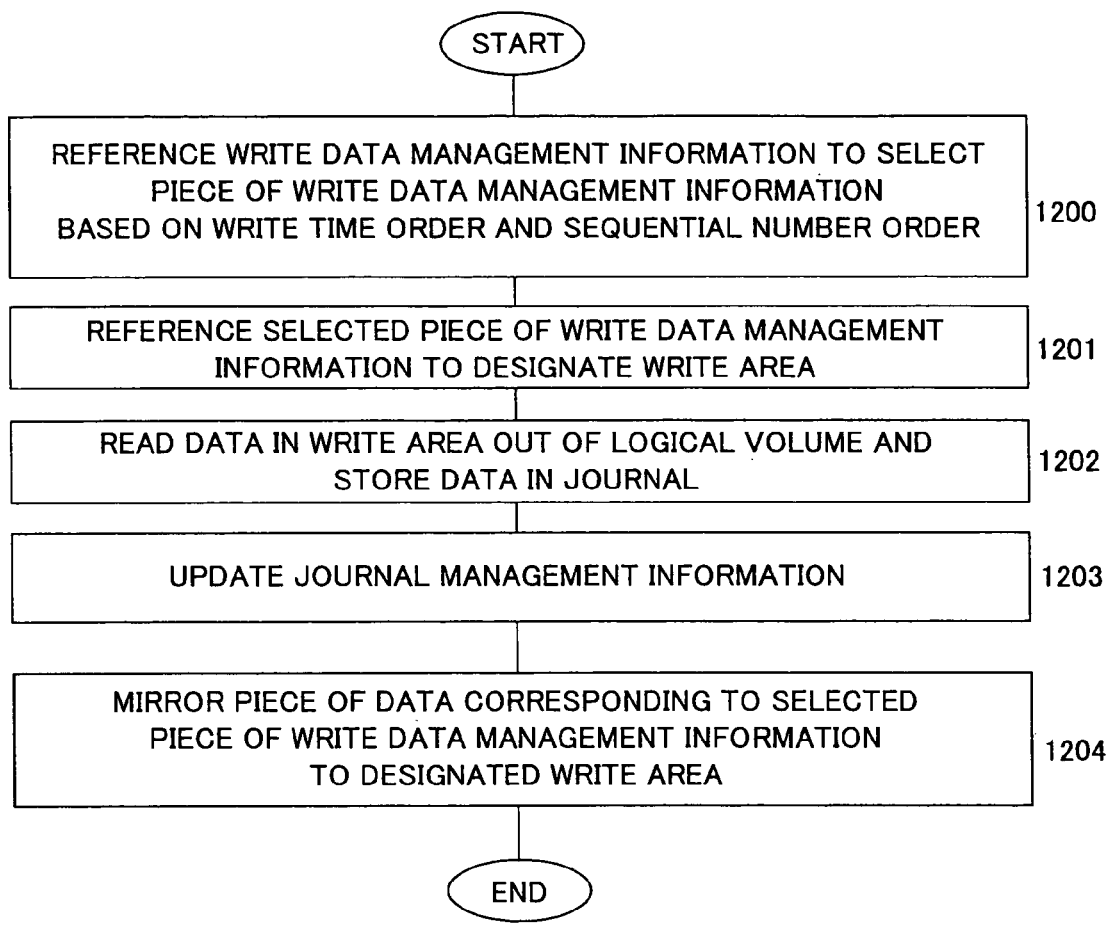
FIG. 8 is a flow chart of a process of mirroring write data in the storage system B according to the first embodiment of this invention.
FIG. 9 is a structural diagram of journal management information.

FIG. 8 is a flow chart of a process of mirroring write data in the secondary storage system B 190.

Such a mirror process is executed by the write data mirroring module B 240, whereby the write data transferred from the primary storage system A 100 is stored in the logical volume 500 of the secondary storage system B 190.

First, the write data mirroring module B 240 selects a piece of write data management information based on the write time order and the sequential number order, by refereeing to the write data management information 330. According to this step, the order in which pieces of write data are stored in the logical volume 500 is determined (step 1200).

After that, the write data mirroring module B 240, by referring to the selected piece of write data management information, identifies the logical volume ID, the write address, and the write data length. And the write data mirroring module B 240 designates a write area of the logical volume 500 in which the piece of write data is to be stored (step 1201).

Subsequently, the write data mirroring module B 240 reads data stored in the write area designated in step 1201 of the logical volume 500 and stores the data in the journal 700 (step 1202). Then, the write time of the piece of write data to be stored in the logical volume 500 is registered as a latest write time 362 of journal management information. Further, the write data mirroring module B 240 updates a journal storage end point 366 based on a location where the journal to which the data has been added is stored (step 1203).

Finally the write data mirroring module B 240 stores the piece of write data corresponding to the selected piece of write data management information in the write area specified in step 1201 (step 1204).

According to the above process, the write data transferred from the primary storage system A 100 is mirrored to the logical volume 500 of the secondary storage system B 190. In addition, the past data stored in the logical volume 500 of the secondary storage system B 190 is stored in the journal 700 to be used in a rollback process (refer to FIG. 11).

FIG. 9 is a structural diagram of journal management information 360 provided to each logical volume group.

In the journal management information 360, information for managing the journal 700 is defined. The journal management information 360 includes a group ID 361, the latest write time 362, an earliest write time 363, a deletable write time 364, a journal storage start point 365, and the journal storage end point 366.

The group ID 361 is an identifier that specifies the logical volume group uniquely.

The latest write time 362 and the earliest write time 363 indicate the range of the write times whose pieces of data are recorded in journals. Specifically, the latest write time 362 indicates the write time whose data is recorded in the latest journal, and the earliest write time 363 indicates the write time whose data is recorded in the earliest journal.

The deletable write time 364 is information indicating the write time whose data is recorded in the latest journal that can be deleted. The deletable write time 364 is used for deleting a journal when the area for the journal is insufficient.

The journal storage start point 365 and the journal storage end point 366 indicate the location where a journal is stored in the logical volume.

FIG. 10 is a structural diagram of the journal 700 of the secondary storage system B 190.

Stored in the journal 700 are data on which the write data transferred from the primary storage system A 100 to the secondary storage system B 190 is not yet mirrored to the logical volume 500, and the management information for the data. The journal 700 includes a sequential number 701, a write time 702, a journal data length 703, a logical volume ID 704, a write address 705, a write data length 706, and pre-mirror data 707.

The sequential number 701 is an identifier that specifies each piece of pre-mirror data stored in the journal 700, and is defined to have the value increment sequentially by one from "0".

The write time 702 is the write time of a piece of write data to be mirrored. The journal data length 703 indicates the total length from the sequential number 701 to the pre-mirror data 707.

The logical volume ID 704 is an identifier of the logical volume 500 that stored the pre-mirror data 707. The write address 705 is an address of the logical volume 500 where the pre-mirror data 707 is stored. The write data length 706 is the length of the pre-mirror data 707.

The piece of journal data described above includes pre-mirror data 707 and the information from the sequential number 701 to the write data length 706 appended to pre-mirror data 707. The journal 700 contains plural pieces of journal data.

Figure 11:
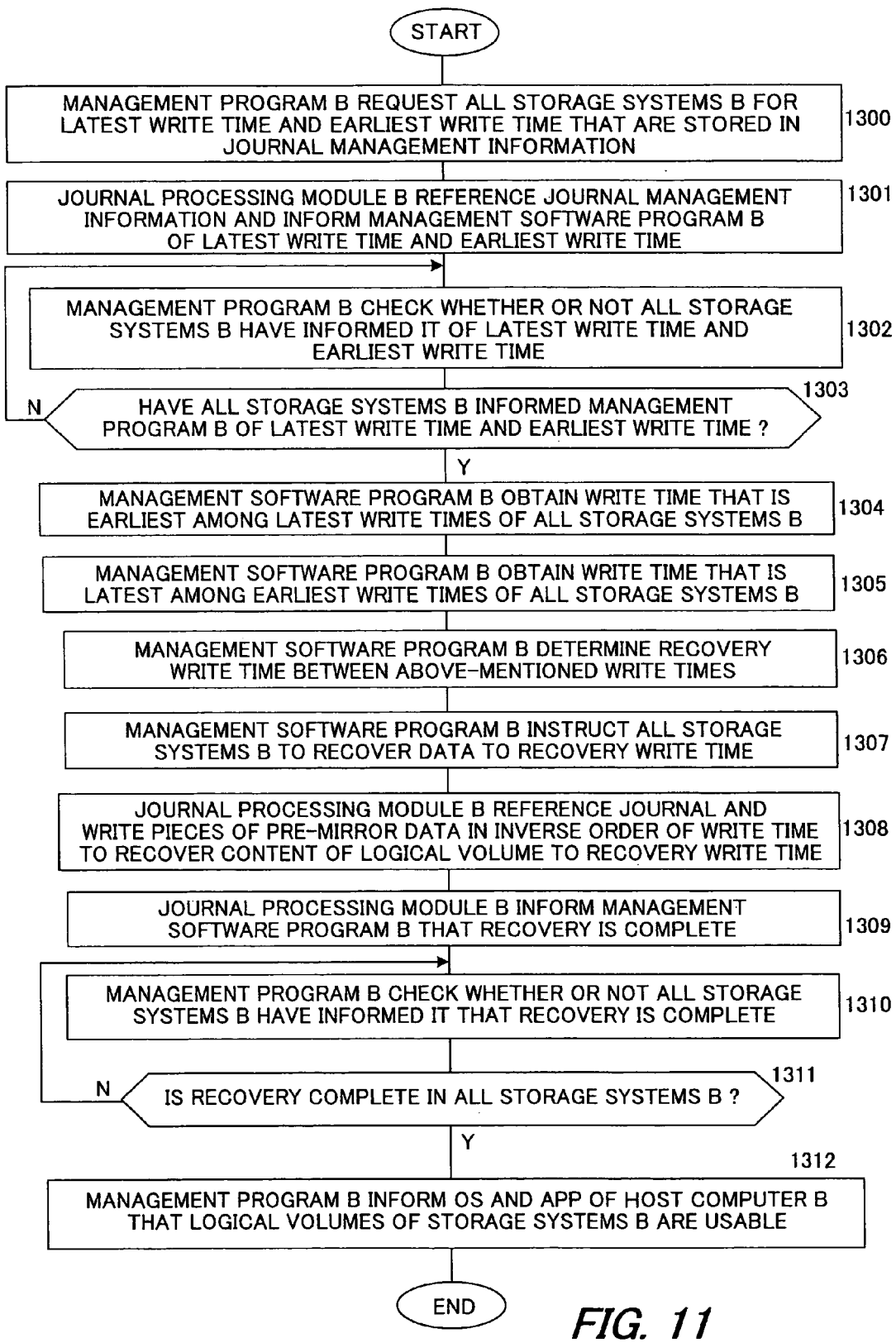
FIG. 11 is a flow chart of a rollback process for recovering consistency of the contents of logical volumes in the storage systems B according to the first embodiment of this invention.

FIG. 11 is a flow chart of a rollback process for recovering consistency of the contents of logical volumes in the secondary storage systems B 190.

First, the management program B 890 requests all the secondary storage systems B 190 for the latest write time and the earliest write time that are stored in the journal management information 360 (step 1300).

When each secondary storage system B 190 receives a send request for the latest write time and the earliest write time, the journal processing module B 260 reads the latest write time 362 and the earliest write time 363 from the journal management information 360 of each logical volume group, and informs the management program B 890 of the range for the journals stored in the secondary storage system B 190 (step 1301).

After that, the management program B 890 checks whether all the secondary storage systems B 190 have informed it of the latest write time and the earliest write time (step 1302).

When the latest write times and the earliest write times are informed by all the secondary storage systems B 190 (step 1303), the management program B 890 obtains a write time that is earliest among the latest write times of all the secondary storage systems B 190 (step 1304). In addition, the management program B 890 obtains a write time that is latest among the earliest write times of all the secondary storage systems B 190 (step 1305).

After that, the management program B 890 determines a recovery write time between the obtained write time that is earliest among the latest write times and the obtained write time that is latest among the earliest write times (step 1306). It should be noted that between the write time that is earliest among the latest write times obtained and the write time that is latest among the earliest write times obtained, journals are stored in the logical volumes 500 of all the secondary storage systems B 190. Therefore, consistency can be maintained by recovering data of all the secondary storage systems B 190 to any time within the range in synchronization with each other. It should be noted that recovery is normally desired to be made to the latest time that all systems have consistent data, so that it is desired that the write time that is earliest among the latest write times and the earliest among the latest write times obtained in step 1304 is set as the recovery write time.

The management program B 890 then instructs all the secondary storage systems B 190 to recover the data to the recovery write time (step 1307).

When an instruction to recover the data is received, each secondary storage system B 190 controls the journal processing module B 260, by referring to the journal 700 writes pieces of pre-mirror data 707 to the logical volume 500 in the inverse order of the write time 702 (the latest write time first) to recover the content of the logical volume 500 to the recovery write time (step 1308).

When the logical volume 500 is recovered, the journal processing module B 260 notifies the management program B 890 that the recovery is complete (step 1309).

After that, the management program B 890 checks whether or not all the secondary storage systems B 190 have notified it that the recovery is complete (step 1310).

When the recovery is complete in all the secondary storage systems B 190 (step 1311), the management program B 890 informs the operating system 610 and the application program 620 of the host computer B 690 that the logical volumes 500 of the secondary storage systems B 190 are usable (step 1312).

As described above, in the rollback process, the recovery write time is determined between the obtained write time that is earliest among the latest write times and the obtained write time that is latest among the earliest write times. All the secondary storage systems B 190 have the data recovered to the recovery write time in synchronization with each other.

Figure 12:
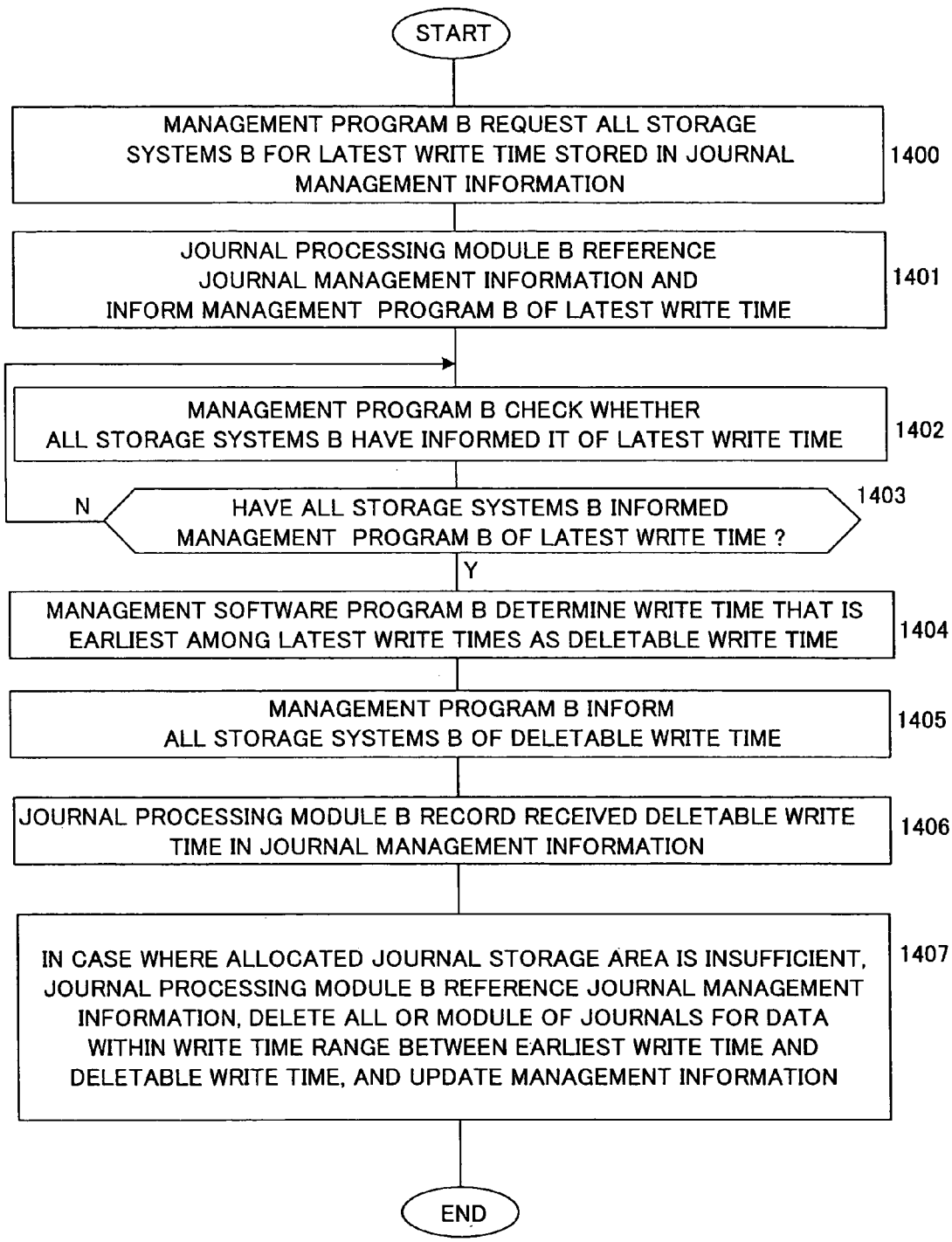
FIG. 12 is a flow chart of a process of deleting journals stored in the storage system B according to the first embodiment of this invention.

FIG. 12 is a flow chart of a process of deleting journals stored in the secondary storage system B 190.

First, the management program B 890 requests all the secondary storage systems B 190 for the latest write time stored in the journal 700 (step 1400).

When each secondary storage system B 190 receives a send request for the latest write time, the journal processing module B 260 reads the latest write time 362 from the journal management information 360 of each logical volume group, and informs the management program B 890 of the latest write time for the journals stored in the secondary storage system B 190 (step 1401).

After that, the management program B 890 checks whether all the secondary storage systems B 190 have informed it of the latest write time (step 1402).

When the latest write times are informed by all the secondary storage systems B 190 (step 1403), the management program B 890 obtains a write time that is earliest among the latest write times of all the secondary storage systems B 190. Then, the management program B 890 determines the obtained write time that is earliest among the latest write times as a deletable write time (step 1404). It should be noted that, the write data corresponding the journals up to the obtained write time that is earliest among the latest write times has been mirrored in the logical volumes 500 of all the secondary storage systems B 190. Therefore, the journal 700 for pieces of data of up to the obtained write time that is earliest among the latest write times is no longer used for the rollback process (FIG. 11).

The management program B 890 then informs all the secondary storage systems B 190 of the determined deletable write time (step 1405).

When the deletable write time is received, each secondary storage system B 190 controls the journal processing module B 260 to record the received deletable write time as the deletable write time 364 of the journal management information (step 1406).

In the case where the amount of data of journals increases to make a predetermined journal storage area insufficient, the journal processing module B 260 of the secondary storage system B 190, by referring to the journal management information 360, deletes all or part of the journals within the write time range between the earliest write time and the deletable write time. Accordingly, the latest write time among the write times for stored journals is registered as the latest write time 362 of the journal management information. Further, the journal storage start point 365 and/or the journal storage end point 366 are updated based on the location where the deleted journal was stored (step 1407).

The process of deleting journals described above is executed in the background of normal processes at predetermined timings (e.g., periodically). Further, the secondary storage system B 190 may monitor the data amount of journals, and the journal processing module B 260 may request the management program B 890 to execute the process of deleting a journal when the data amount is larger than a predetermined value.

As described above, in the process of deleting a journal, the obtained write time that is earliest among the latest write times is determined as the deletable write time. The journal data whose write time is equal to or earlier than the deletable write time is not required for the data recovery of the secondary storage system B 190, so that the secondary storage system B 190 deletes the journal data as necessary.

Figure 13:
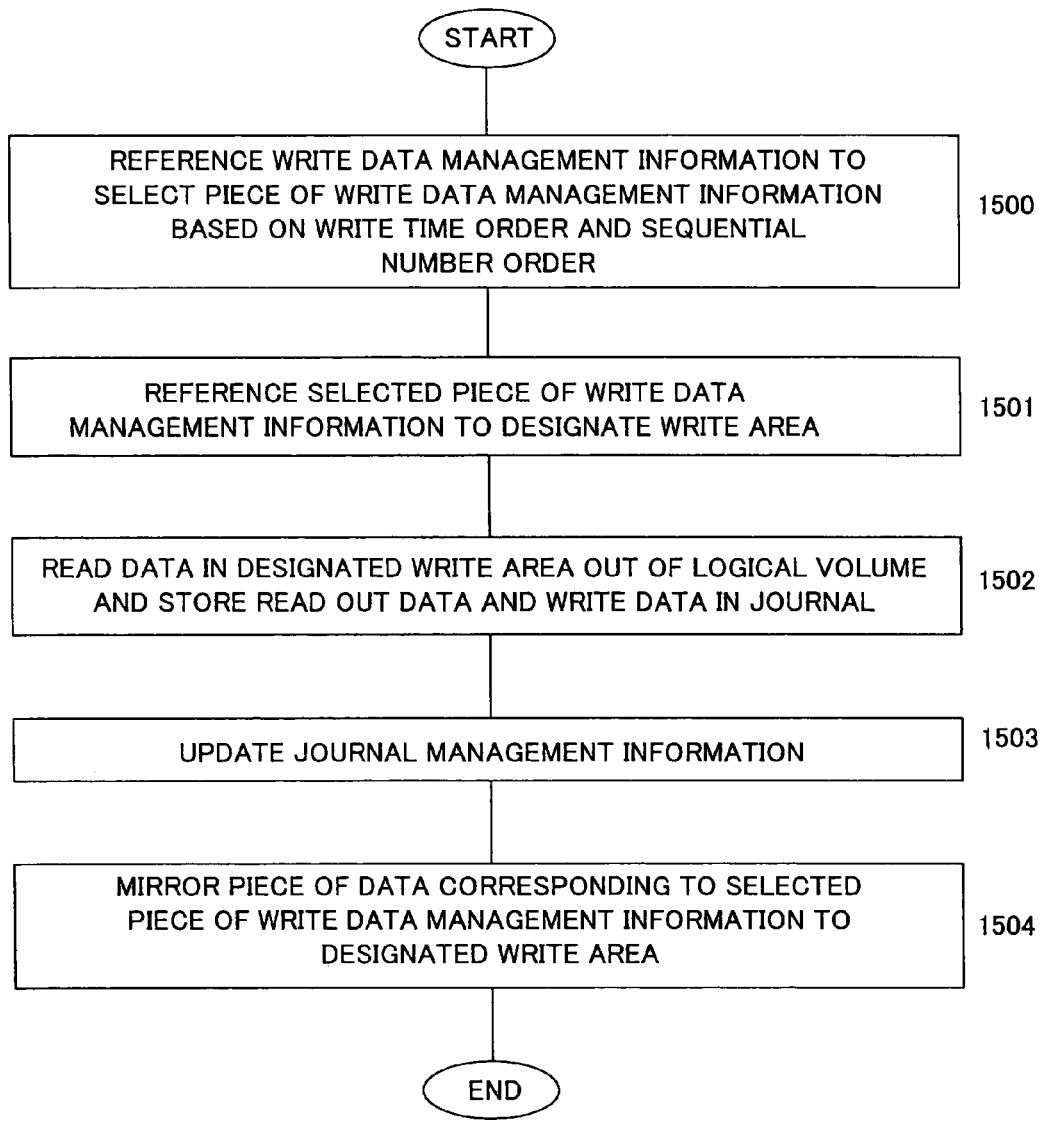
FIG. 13 is a flow chart of a modified example of the process of mirroring write data in the storage system B according to the first embodiment of this invention.

FIG. 13 is a flow chart of the modified example of the process of mirroring write data in the secondary storage system B 190.

The modified example of the process of mirroring write data is different from the process of mirroring write data described above (FIG. 8) in that the write data itself is also stored in a journal.

First, the write data mirroring module B 240 selects a piece of write data management information based on the write time order and the sequential number order, by referring to the write data management information 330. According to this step, the order in which pieces of write data are stored in the logical volume 500 is determined (step 1500).

After that, the write data mirroring module B 240, by referring to the selected piece of write data management information, identifies the logical volume ID, the write address, and the write data length. And the write data mirroring module B 240 designates the write area of the logical volume 500 in which the piece of write data is to be stored (step 1501).

Subsequently, the write data mirroring module B 240 reads data stored in the write area designated in step 1501 of the logical volume 500 and stores the read out data and the piece of write data in the journal 700 (step 1502). Then, the write data mirroring module B 240 updates the latest write time 361 and the journal storage end point 366 of the journal management information (step 1503).

Finally the write data mirroring module B 240 stores the piece of write data corresponding to the selected piece of write data management information in the write area specified in step 1501 (step 1504).

According to the above process, the write data transferred from the primary storage system A 100 is mirrored to the logical volume 500 of the secondary storage system B 190. In addition, the past data stored in the logical volume 500 of the secondary storage system B 190 and the data to be written to the logical volume 500 are stored in the journal 700 to be used in a rollback process (refer to FIG. 15).

Figure 14:
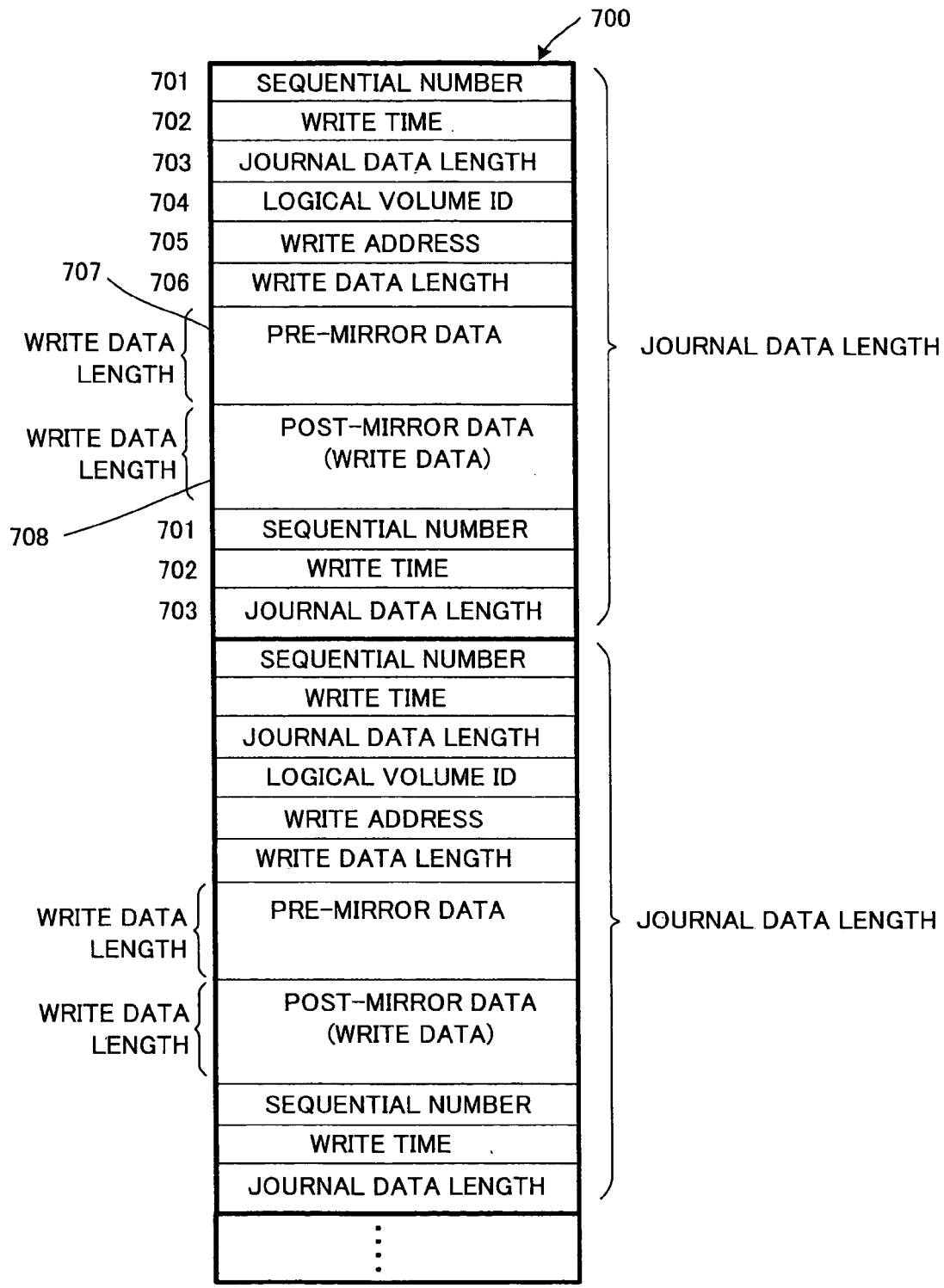
FIG. 14 is a structural diagram of a journal in the case of FIG. 13.

FIG. 14 is a structural diagram of the journal 700 according to the modified example of the write data mirroring process (FIG. 13).

Stored in the journal 700 are data on which the write data transferred from the primary storage system A 100 to the secondary storage system B 190 is not yet mirrored to the logical volume 500, write data to be stored in the logical volume 500 of the secondary storage system B 190, and the management information for the data.

The journal according to the modified example includes a sequential number 701, a write time 702, a journal data length 703, a logical volume ID 704, a write address 705, a write data length 706, pre-mirror data 707, and post-mirror data (write data) 708. It should be noted that pieces of data other than the post-mirror data 708 are the same as those of the journal (FIG. 10), and their detailed description will be omitted.

Further, the sequential number 701, the write time 702, and the journal data length 703 are stored on a significant address side of the jounal. The information consisting of 701, 702, and 703 stored on the significant address side of the post-mirror data 708 are used for searching the journal 700 from the significant address. It should be noted that, in the case where the journal 700 is searched from the significant address, the first portion (including the write time 702 and the journal data length 703) of a unit journal has only to be read to determine whether the unit journal is necessary for recovering process, so that the data of the next journal can be read with efficiency.

Figure 15:
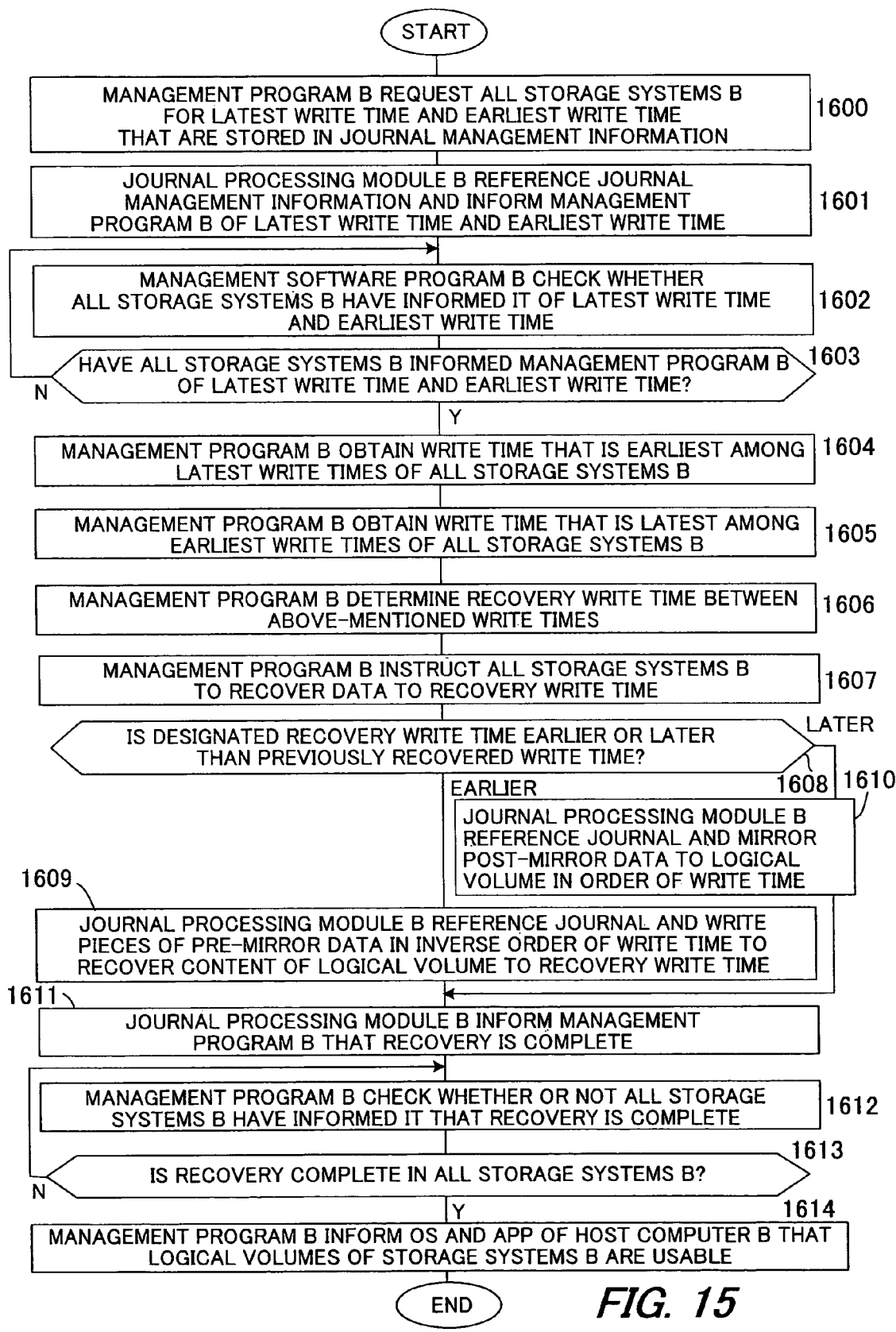
FIG. 15 is a flow chart of a rollback/rollforward process for recovering consistency of the contents of logical volumes in the storage systems B in the case of FIG. 13.

FIG. 15 is a flow chart of a rollback/rollforward process for recovering consistency of the contents of logical volumes 500 in the secondary storage systems B 190 according to the modified example of the write data mirroring process (FIG. 13).

First, the management program B 890 requests all the secondary storage systems B 190 for the latest write time and the earliest write time that are stored in the journal 700 (step 1600).

When each secondary storage system B 190 receives a send request for the latest write time and the earliest write time, the journal processing module B 260 reads the latest write time 362 and the earliest write time 363 from the journal management information 360 of each logical volume group, and informs the management program B 890 of the range for the journals stored in the secondary storage system B 190 (step 1601).

After that, the management program B 890 checks whether all the secondary storage systems B 190 have informed it of the latest write time and the earliest write time (step 1602).

When the latest write times and the earliest write times are informed by all the secondary storage systems B 190 (step 1603), the management program B 890 obtains the write time that is earliest among the latest write times of all the secondary storage systems B 190 (step 1604). In addition, the management program B 890 obtains the write time that is latest among the earliest write times of all the secondary storage systems B 190 (step 1605).

After that, the management program B 890 determines the recovery write time between the write time that is earliest among the latest write times obtained and the write time that is latest among the earliest write times obtained (step 1606). It should be noted that between the write time that is earliest among the latest write times obtained and the write time that is latest among the earliest write times obtained, journals are stored in the logical volumes 500 of all the secondary storage systems B 190. Therefore, data of all the secondary storage systems B 190 can be recovered to any time within the range in synchronization with each other. It should be noted that recovery is normally desired to be made to the latest time that all systems have consistent data, so that it is desired that the write time that is earliest among the latest write times and the earliest among the latest write times obtained in step 1604 is set as the recovery write time.

The management program B 890 then instructs all the secondary storage systems B 190 to recover the data to the recovery write time (step 1607).

When an instruction to recover the data are received, each secondary storage system B 190 controls the journal processing module B 260, by referring to the journal management information 360, judges whether the determined recovery write time is earlier or later than a previously recovered write time (step 1608). The previously recovered write time is recorded prior to the rollback/rollforward process (FIG. 15) as the write time of data recovered when another rollback process (FIG. 11) or another rollback/rollforward process (FIG. 15) is executed.

When a result from the judgment indicates that the determined recovery write time is earlier than the previously recovered write time, the journal processing module B 260, by referring to the journal 700, writes pieces of pre-mirror data 707 to the logical volume 500 in the inverse order of the write time 702 (the latest write time first) to recover the content of the logical volume 500 to the recovery write time (step 1609). After that, the process goes to step 1611.

On the other hand, when the determined recovery write time is later than the previously recovered write time, the journal processing module B 260, by referring to the journal 700, writes pieces of post-mirror data 708 to the logical volume 500 in the order of the write time 702 (the earliest write time first) to mirror the content of the logical volume 500 to the recovery write time (step 1610). After that, the process advances to step 1611.

When the logical volume 500 is recovered, the journal processing module B 260 informs the management program B 890 that the recovery is complete (step 1611).

After that, the management program B 890 checks whether all the secondary storage systems B 190 have informed it that the recovery is complete (step 1612).

When the recovery is complete in all the secondary storage systems B 190 (step 1613), the management program B 890 informs the operating system 610 and the application program 620 of the host computer B 690 that the logical volumes 500 of the secondary storage systems B 190 are usable (step 1614).

As described above, in the modified example of the rollback process, when the recovery write time is earlier than the previously recovered write time, the pre-mirror data is used to recover the data to the recovery write time. When the recovery write time is later than the previously recovered write time, the post-mirror data is used to recover the data to the recovery write time. Thus, the data can be recovered to any write time.

In the various processes described above, various instructions, notifications, and pieces of information that are sent/received between the primary storage system A 100 or the secondary storage system B 190 and the management program B 890 may pass either the I/O path 900 or the network 920.

Figure 16:
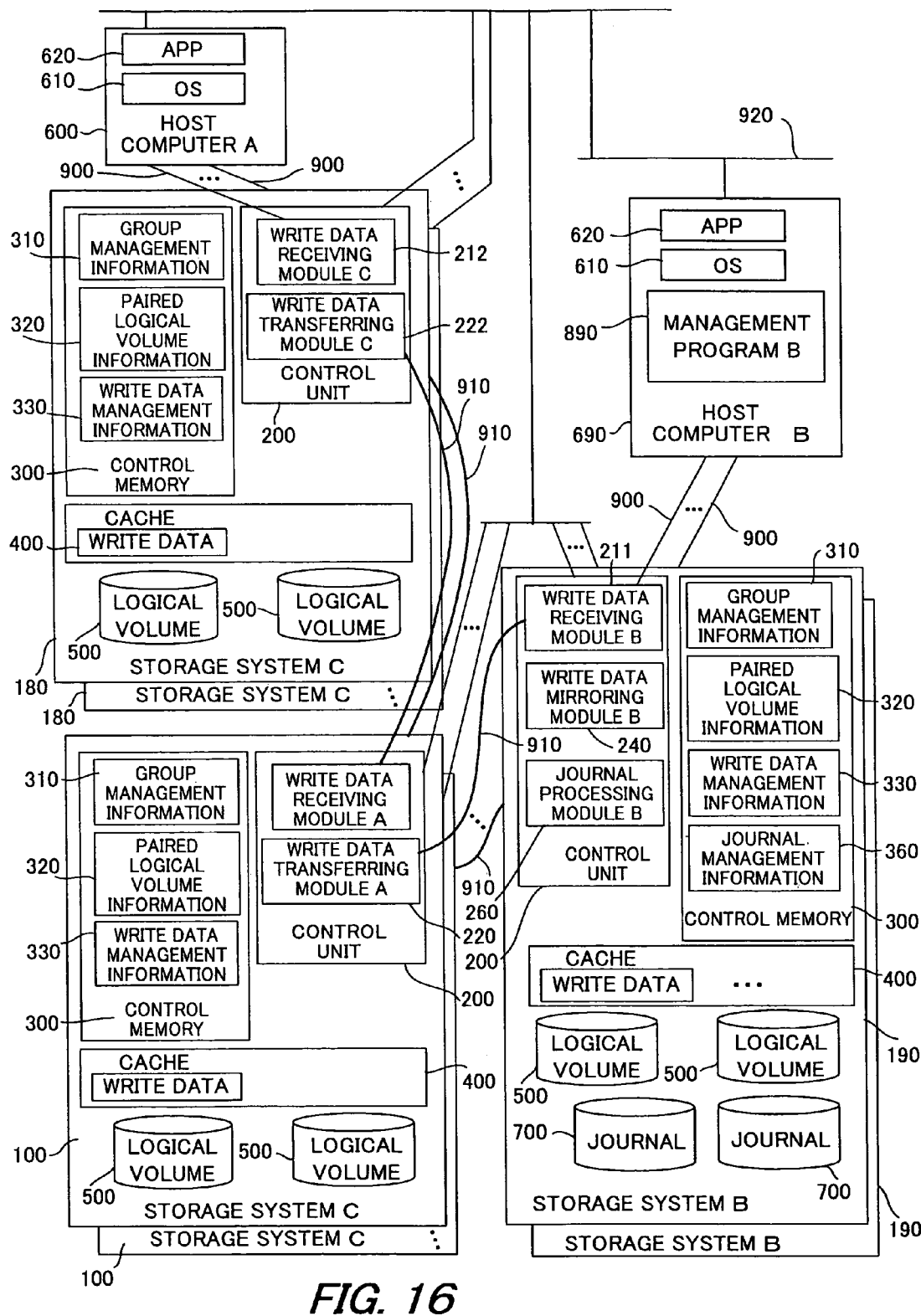
FIG. 16 is a block diagram of a computer system according to a second embodiment of this invention.

FIG. 16 is a block diagram of a computer system according to a second embodiment of this invention.

The computer system according to the second embodiment is different from the computer system according to the first embodiment in that the host computer A 600 is connected to a plurality of primary storage systems C 180 through the I/O paths 900, and the plurality of primary storage systems C 180 are connected to each of the plurality of local storage systems A 100 through the transfer paths 910.

More specifically, the computer system according to the second embodiment is provided with three-stage storage systems consisting of the primary storage systems C 180, the local storage systems A 100, and the remote storage systems B 190. The local storage systems A 100 are set relatively near to (for example, several km from) the primary storage systems C 180. The remote storage systems B 190 are set remotely (for example, several hundreds of km) from the local storage systems A 100. The respective storage systems are connected in series (cascade connection) in the order of the primary storage systems C 180, the local storage system A 100, and the remote storage system B 190.

In the second embodiment, the copy of the data stored in the logical volumes 500 of the primary storage systems C 180 is stored in the logical volumes 500 of the local storage systems A 100. This process for copying data from the primary storage systems C 180 to the local storage systems A 100 is executed as a synchronous copy process.

Further, the copy of the data stored in the logical volumes 500 of the local storage systems A 100 is stored in the logical volumes 500 of the remote storage systems B 190. This process for copying data from the local storage systems A 100 to the remote storage systems B 190 is executed as the same asynchronous copy process as described in the first embodiment.

In other words, in the second embodiment, the copy of the data stored in the logical volumes 500 of the primary storage systems C 180 is stored in the local storage systems A 100 and in the remote storage systems B 190. In order to attain this process, the primary storage systems C 180 are provided with the same configurations, various pieces of information, etc. as the local storage systems A 100 described in the first embodiment.

It should be noted that the local storage systems A 100 and the remote storage systems B 190 of the second embodiment have the same configurations and functions as the local storage systems A 100 and the remote storage systems B 190 of the first embodiment, respectively. Thus, their detailed description will be omitted here.

When a write request to write data to the logical volume 500 is received from the host computer A 600, the primary storage system C 180 stores received write data to the logical volume 500 of the primary storage system C 180. Further, a write data transferring module C 222 transfers the received write data and write time to the write data receiving module A 210 of the local storage system A 100.

At this time, as described above, the process of transferring data from the primary storage system C 180 to the local storage system A 100 is executed as a synchronous backup process. Specifically, after the primary storage system C 180 is informed by the write data receiving module A 210 that it has received the data, the primary storage system C 180 informs the host computer A 600 that the write is complete. Accordingly, the primary storage system C 180 ensures that the copy of the write data for which the write request has been issued exists in the local storage system A 100.

Therefore, for example, in the case where a fault occurs in the local storage system A 100 or the transfer path 910 and data cannot be transferred to the local storage system A 100, the host computer A 600 recognizes that the write process is not complete on the write data that has not been transferred to the local storage system A 100. Also, the write data received by the primary storage system C 180 is reliably stored in the local storage system A 100 as well, so that the expected copy is stored in the local storage system A 100. Further, after all the write data received by the local storage system A 100 is transferred to the remote storage system B 190, the expected copy is stored also in the remote storage system B 190. Accordingly, when the process being executed by the host computer A 600 is interrupted, the host computer B 690 can take over an operation by using the same data as the data recognized by the host computer A 600 as having been written.

Further, by the same process as the first embodiment, the copy of the data stored in the logical volume 500 of the local storage system A 100 is stored in the logical volume 500 of the remote storage system B 190. According to this process, even in the case where, for example, a fault occurs in the local storage system A 100 or the transfer path 910 and data cannot be transferred to the local storage system A 100, when the host computer A 600 interrupts the process, the host computer B 690 can obtain the same data as the data stored in the primary storage system C 180 from the remote storage system B 190, and can therefore take over an operation by using the data.

While the present invention has been described in detail and pictorially in the accompanying drawings, the present invention is not limited to such detail but covers various obvious modifications and equivalent arrangements, which fall within the purview of the appended claims.

What is claimed is:

1. A remote copy system for copying data between a plurality of storage systems, comprising:
   a plurality of first storage systems to and from which data is inputted and outputted, and
   a plurality of second storage systems that are connected to each of the first storage systems;
   each of the first storage systems including a first logical volume that stores the data that is inputted and outputted;
   each of the second storage systems including a second logical volume that stores a copy of the data stored in the first logical volume;
   the remote copy system comprising a pre-update data storage unit that stores pre-update data that is stored before data to be stored in the second logical volume is updated and time stamps of the data to be stored in the second logical volume,
   wherein in each of the second storage systems,
   the pre-update data is stored in the pre-update data storage unit, and then write data transferred from the first storage system is stored in the second logical volume in an order in which the write data is written into the first logical volume;
   pre-update data prior to a recovery time set between a time stamp that is earliest among each of latest time stamps of the second logical volumes stored in the pre-update data storage unit and a time stamp that is latest among each of earliest time stamps of the second logical volumes stored in the pre-update data storage unit is obtained from the pre-update data storage unit; and
   the pre-update data is written to each of the second logical volumes in an inverse order of the time stamp with a latest time stamp first, to recover data of each of the second logical volumes to the recovery time.

2. The remote copy system according to claim 1, wherein the time stamp includes a time at which data is inputted to the first storage system.

3. The remote copy system according to claim 1, wherein the recovery time includes an earliest time stamp among the latest time stamps of the data stored in the second logical volume.

4. The remote copy system according to claim 1, wherein:
   the pre-update data storage unit further stores post-update data stored in the second logical volume; and
   in each of the second storage systems,
   the time stamp of the latest data that is currently stored in the second logical volume is compared with the recovery time;
   when the time stamp of the latest data that is currently stored in the second logical volume is later than the recovery time, the pre-update data after the recovery time is obtained from the pre-update data storage unit and the obtained pre-update data is written to the second logical volume in the inverse order of the time stamp with the latest time stamp first; and
   when the time stamp of the latest data that is currently stored in the second logical volume is earlier than the recovery time, the post-update data prior to the recovery time is obtained from the pre-update data storage unit and the obtained post-update data is written to the second logical volume in the order of the time stamp with the earliest time stamp first.

5. The remote copy system according to claim 1, further comprising:
   a first computer that is connected to the first storage system; and
   a second computer that is connected to the second storage system, wherein:
   each of the second storage systems comprises the pre-update data storage unit;

the first computer inputs and outputs data to and from the first storage system; and the second computer:
obtains the time stamps stored in the pre-update data storage unit from the second storage system;
obtains the latest time stamp and the earliest time stamp from the obtained time stamps;
determines the recovery time between the obtained latest time stamp and the obtained earliest time stamp; and
instructs each of the second storage systems to recover data to the determined recovery time.

6. The remote copy system according to claim 5, wherein:
the second computer:
obtains the time stamps of the data stored in the second logical volume from the second storage system;
determines, as a deletable time, the earliest time stamp among the latest time stamps of the data stored in the second logical volume; and
informs the second storage system of the determined deletable time; and
in the second storage system, the pre-update data having a time stamp earlier than the received deletable time is deleted from the pre-update data storage unit.

7. A remote copy system for copying data between a plurality of storage systems, comprising:
a plurality of first storage systems to and from which data is inputted and outputted,
a plurality of second storage systems that are connected to each of the first storage systems, and
a plurality of third storage systems that are connected to each of the second storage systems,
each of the first storage systems including a first logical volume that stores the data that is inputted and outputted;
each of the second storage systems including a second logical volume that stores a copy of the data stored in the first logical volume;
each of the third storage systems comprising a third logical volume that stores a copy of the data stored in the second logical volume;
the remote copy system comprising a pre-update data storage unit that stores pre-update data that is stored before data to be stored in the third logical volume is updated and time stamps of the data to be stored in the third logical volume,
wherein in each of the third storage systems,
the pre-update data is stored in the pre-update data storage unit, and then write data transferred from the second storage system is stored in the third logical volume in an order in which the write data is written into the first logical volume;
pre-update data prior to a recovery time set between a time stamp that is earliest among each of latesttime stamps of the third loqical volumes stored in the pre-update data storage unit and a time stamp that is latest among each of earliest time stamps of the third loqical volumes stored in the pre-update data storage unit is obtained from the pre-update data storage unit; and
the pre-update data is written to each of the third logical volumes in an inverse order of the time stamp with a latest time stamp first, to recover data of each of the third logical volume to the recovery time.

8. The remote copy system according to claim 7, wherein the time stamp includes a time at which data is inputted to the first storage system.

9. The remote copy system according to claim 7, wherein the recovery time includes an earliest time stamp among the latest time stamps of the data stored in the second logical volume.

10. The remote copy system according to claim 7, wherein:
the pre-update data storage unit further stores post-update data stored in the third logical volume; and
in each of the third storage systems,
the time stamp of the latest data that is currently stored in the third logical volume is compared with the previous recovery time;
when the time stamp of the latest data that is currently stored in the third logical volume is later than the recovery time, the pre-update data after the recovery time is obtained from the pre-update data storage unit and the obtained pre-update data is written to the third logical volume in the inverse order of the time stamp with the latest time stamp first; and
when the time stamp of the latest data that is currently stored in the third logical volume is earlier than the recovery time, the post-update data prior to the recovery time is obtained from the pre-update data storage unit and the obtained post-update data is written to the third logical volume in the order of the time stamp with the earliest time stamp first.

11. The remote copy system according to claim 7, further comprising:
a first computer that is connected to the first storage system; and
a second computer that is connected to the third storage system, wherein:
each of the second storage systems comprises the pre-update data storage unit;
the first computer inputs and outputs data to and from the first storage system; and
the second computer:
obtains the time stamps stored in the pre-update data storage unit from the second storage system;
obtains the latest time stamp and the earliest time stamp from the obtained time stamps;
determines the recovery time between the obtained latest time stamp and the obtained earliest time stamp; and
instructs each of the third storage systems to recover data to the determined recovery time.

12. The remote copy system according to claim 11, wherein:
the second computer:
obtains the time stamps of the data stored in the third logical volume from the third storage system;
determines, as a deletable time, the earliest time stamp among the latest time stamps of the data stored in the third logical volume; and
informs the third storage system of the determined deletable time; and
in the third storage system, the pre-update data having a time stamp earlier than the received deletable time is deleted from the pre-update data storage unit.

13. A storage system for a plurality of secondary storage systems that are connected to each of a plurality of primary storage systems and copy data stored in the plurality of primary storage systems;
each of the primary storage systems comprising a primary logical volume that stores data that is inputted and outputted from a computer;

each of the secondary storage systems including a secondary logical volume that stores a copy of the data stored in the primary logical volume, and a pre-update data storage unit that stores pre-update data that is stored before data to be stored in the secondary logical volume is updated and time stamps of the data to be stored in the secondary logical volume; wherein:

the pre-update data is stored in the pre-update data storage unit, and then write data transferred from the primary storage system is stored in the secondary logical volume in an order in which the write data is written into the primary logical volume;

pre-update data prior to a recovery time set between a time stamp that is earliest among each of latest time stamps of the secondary logical volumes stored in the pre-update data storage unit and a time stamp that is latest among each of earliest time stamps of the secondary logical volumes stored in the pre-update data storage unit is obtained from the pre-update data storage unit; and the pre-update data is written to each of the secondary logical volumes in an inverse order of the time stamp with a latest time stamp first, to recover data of each of the secondary logical volume to the recovery time.

14. The storage system according to claim 13, wherein the time stamp includes a time at which data is inputted to the primary storage system.

15. The storage system according to claim 13, wherein the recovery time includes an earliest time stamp among the latest time stamps of the data stored in the secondary logical volume.

16. The storage system according to claim 13, wherein:

the pre-update data storage unit further stores post-update data stored in the secondary logical volume;

the time stamp of the latest data that is currently stored in the secondary logical volume is compared with the recovery time;

when the time stamp of the latest data that is currently stored in the secondary logical volume is later than the recovery time, the pre-update data after the recovery time is obtained from the pre-update data storage unit and the obtained pre-update data is written to the secondary logical volume in the inverse order of the time stamp with the latest time stamp first; and when the time stamp of the latest data that is currently stored in the secondary logical volume is earlier than the recovery time, the post-update data prior to the recovery time is obtained from the pre-update data storage unit and the obtained post-update data is written to the secondary logical volume in the order of the time stamp with the earliest time stamp first.

17. The storage system according to claim 13, further:

obtains the time stamps stored in the pre-update data storage unit from each of the secondary storage system, obtains the latest time stamp and the earliest time stamp from the obtained time stamps, determines the recovery time between the obtained latest time stamp and the obtained earliest time stamp, and recovers data to the determined recovery time.

18. The storage system according to claim 17, further:

obtains the time stamps of the data stored in the secondary logical volume from the secondary storage system, determines, as a deletable time, the earliest time stamp among the latest time stamps of the data stored in the secondary logical volume, informs another secondary storage system of the determined deletable time, and deletes the pre-update data having a time stamp earlier than the determined deletable time from the pre-update data storage unit.

* * * * *